Aug. 22, 1933.  J. W. TATTER ET AL  1,923,463
BRAKE OPERATING DEVICE
Filed Dec. 23, 1929  3 Sheets-Sheet 2
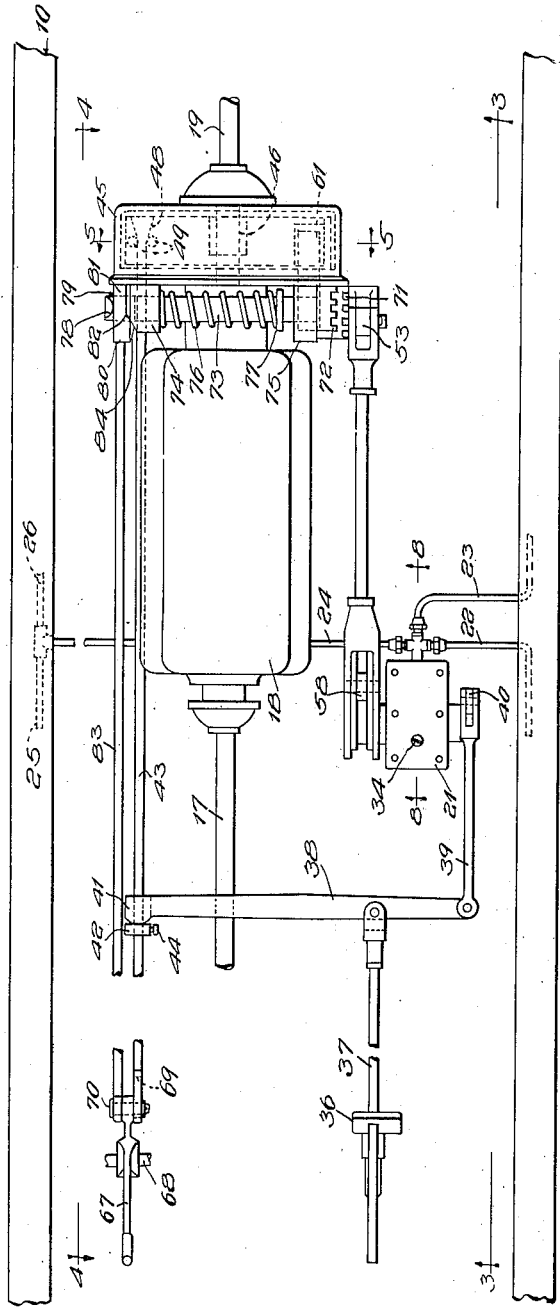
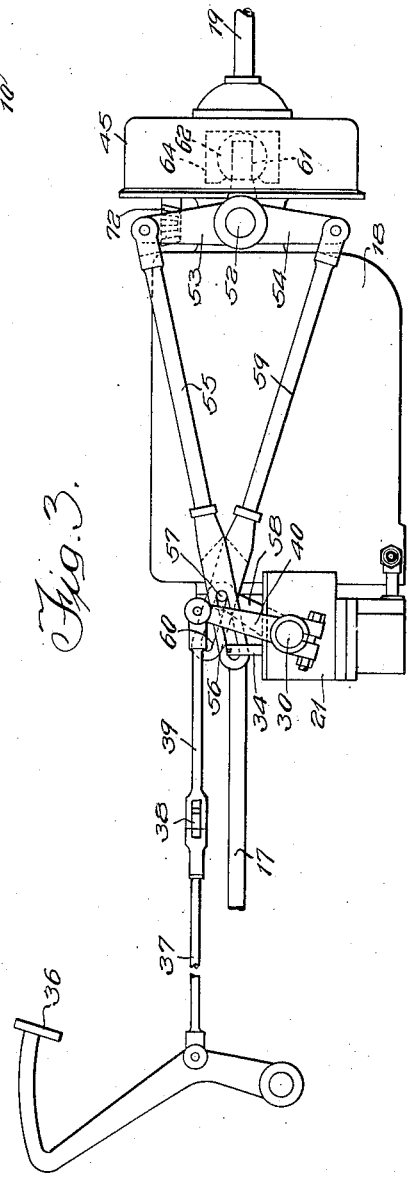
Inventors
John W. Tatter
Frederick W. Sampson
By Hill & Hill
Attys
Witness:
William G. Kilroy Aug. 22, 1933.  J. W. TATTER ET AL  1,923,463
BRAKE OPERATING DEVICE
Filed Dec. 23, 1929  3 Sheets-Sheet 3
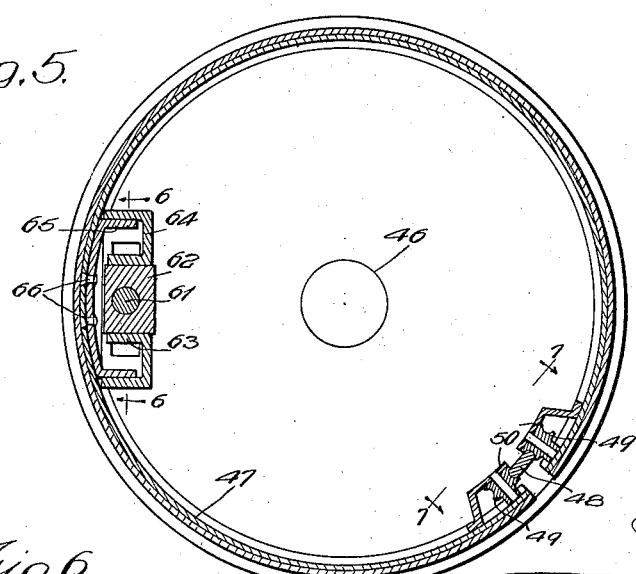
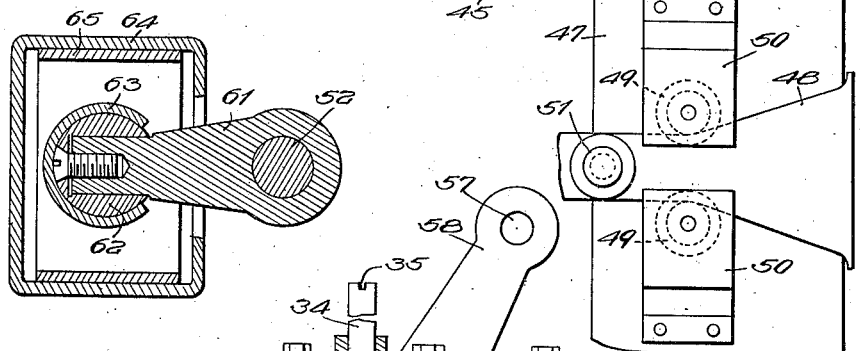
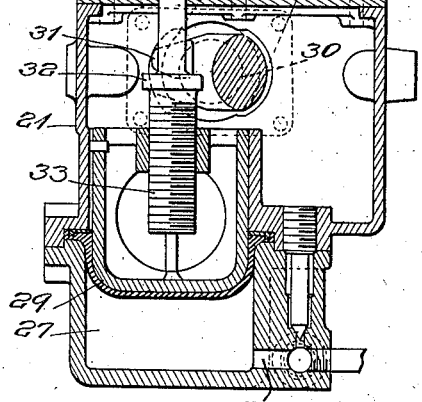
Witness:
William P. Kilroy
Inventors
John W. Tatter
Frederick W. Sampson
By Hill & Hill Attys Patented Aug. 22, 1933

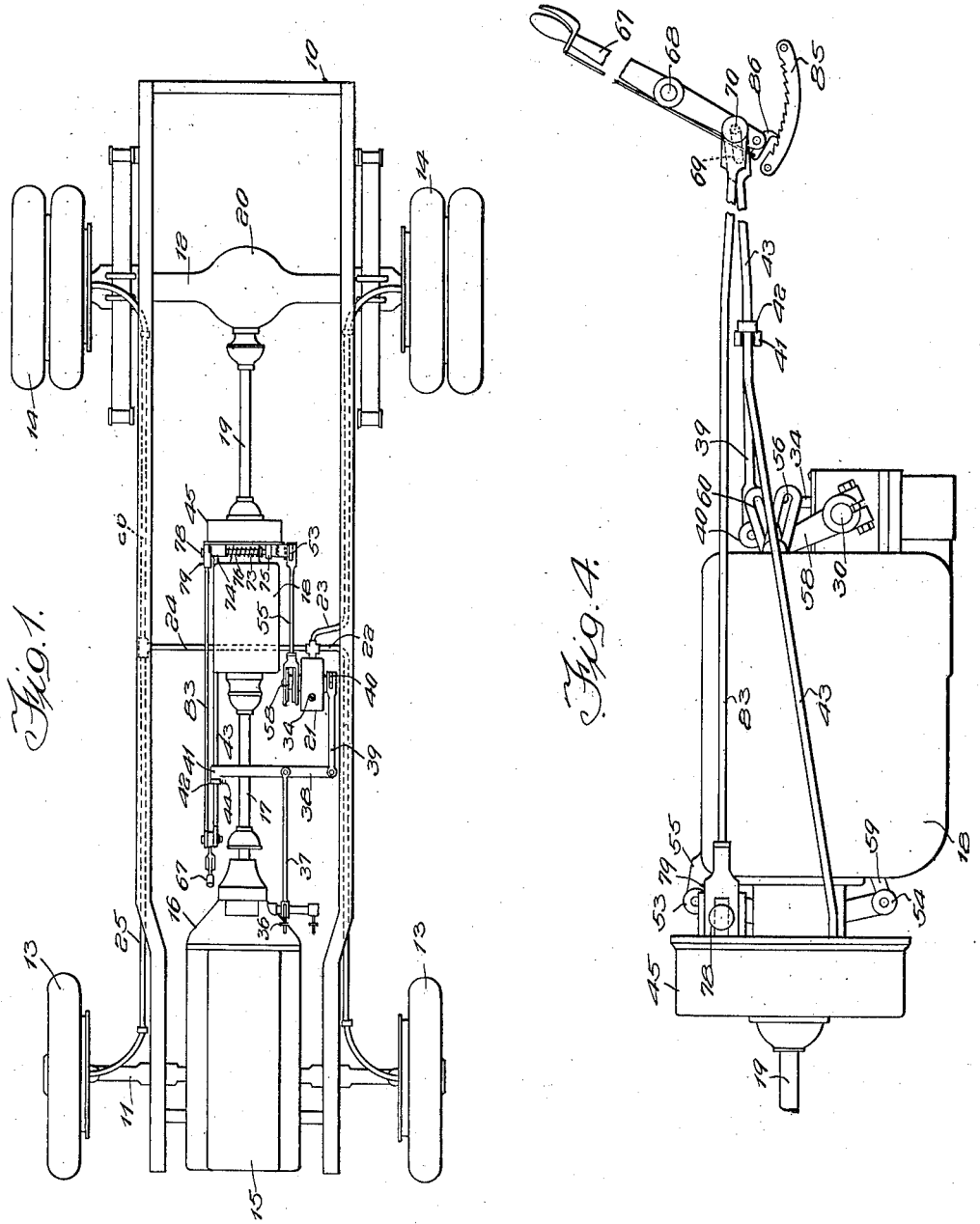

1,923,463

UNITED STATES PATENT OFFICE 1,923,463

BRAKE OPERATING DEVICE

John W. Tatter, Chicago, Ill., and Frederick W. Sampson, Dayton, Ohio, assignors to Lewis Differential Company, Chicago, Ill., a Corporation of Illinois.

Application December 23, 1929
Serial No. 416,040

16 Claims. (Cl. 188—152)

This invention relates to brake operating devices and particularly to means for augmenting the operation of manually operated brake mechanism. The present invention is particularly adaptable for use on heavy motor vehicles such as trucks, busses or the like, having a local power plant for the propulsion of the vehicle.

One object of the present invention is to provide power operated means for augmenting the operation of manually operated brake mechanism.

Another object of the invention is to provide manually controlled power operated means for augmenting the operation of manually operated brake mechanism.

Another object of the invention is to provide manually controlled power operated means for actuating the brake mechanism.

Another object of the invention is to provide means for securing or retaining the power actuated means in brake operating position.

Another object of the invention is to provide means whereby the hand operated emergency brake may operate independently of the wheel or service brakes of the vehicle, and also, if desired, may be actuated to retain the service brakes in operating position.

Another object of the invention is to provide a construction and arrangement wherein the power employed for actuating the brake mechanism or augmenting the operation of the manually operated means is derived from the source of power provided for operating the vehicle.

Another object of the invention is to provide a construction and arrangement wherein the power employed for actuating the brake mechanism or augmenting the operation of the manually operated means is derived from the energy of the vehicle in motion.

Another object of the invention is to provide a construction and arrangement of the character described which will function to augment the operation of the wheel brake mechanism whether the vehicle is being operated in a forwardly or rearwardly direction.

A further object of the invention is to provide a device of the character described which is simple in construction, efficient in its operation, and cheap to manufacture and install.

A further object of the invention is to improve devices of the character disclosed in sundry details herein after described and particularly pointed out in the appended claims.

One embodiment of the present invention is shown for illustrative purposes in the accompanying drawings in which:

Fig. 1 is a plan view of a motor vehicle chassis illustrating the application of our improved brake operating device thereto;

Fig. 2 is an enlarged plan view of a portion of the structure shown in Fig. 1 illustrating an embodiment of the present invention;

Fig. 3 is a fragmentary elevational view of the structure shown in Fig. 2 taken as indicated by the line 3—3 thereof;

Fig. 4 is a fragmentary elevational view of the structure shown in Fig. 2 taken as indicated by the line 4—4 thereof;

Fig. 5 is a transverse sectional elevation of a portion of the mechanism illustrated in Fig. 2 and taken as indicated by the line 5—5 thereof;

Fig. 6 is an enlarged sectional elevation taken substantially as indicated by the line 6—6 of Fig. 5;

Fig. 7 is an enlarged fragmentary elevational view of a portion of the structure illustrated in Fig. 5 and taken as indicated by the line 7—7 thereof; and Fig. 8 is an enlarged sectional elevation of a master cylinder forming a part of the brake mechanism and taken substantially as indicated by the line 8—8 of Fig. 2.

The present embodiment of the invention is shown as applied to a motor vehicle chassis of the type employed for heavy trucks or the like, which comprises a frame 10 supported on front and rear axles 11 and 12, respectively, on the ends of which are suitably mounted the supporting wheels 13 and driving wheels 14, respectively.

Suitably mounted on the frame 10 is a power plant such, for example, as shown diagrammatically in the present instance as an internal combustion engine 15 having a clutch case 16 secured to the rear end thereof, and from which extends a short driving shaft 17 for transmitting power to the gearing within the transmission housing 18, a structure common in heavy vehicles such as trucks, or the like, and extending rearwardly from the transmission housing is a propellor shaft 19 by which power is transmitted to the driving mechanism contained in the differential housing 20 formed on the rear axle for driving the wheels 14 of the vehicle.

The wheel brake mechanism shown in the present embodiment is of the hydraulic type and includes a master cylinder housing 21 operatively connected by means of tubes 22 and 23 with suitable brake band or brake shoe operating mechanism associated with the front and rear wheels 13 and 14, respectively, on one side of the chassis, and by means of a tube 24 and branch tubes 25 and 26 with suitable brake band or brake shoe operating mechanism associated with the front and rear wheels 13 and 14, respectively, on the opposite side of the chassis.

The housing 21 is provided with a pressure cylinder 27 communicating with the respective tubes through a passage 28 formed in the housing, and slidably mounted in the cylinder 27 is a piston 29 by means of which a pressure is created in the chamber for actuating the brake bands or shoes associated with the respective supporting wheels 13 and 14 of the vehicle.

For actuating the piston 29, a rock shaft 30 is rotatably mounted in the housing 20 and provided adjacent its central portion with a crank arm 31 adapted to engage a shoulder 32 formed on an adjusting screw 33 adjustably connected to the piston 29, the adjusting screw 33 being provided with an upwardly extending shank portion 34 adapted to protrude from the housing and provided with a slot 35 at its upper end, by means of which the screw 33 may be rotated, thereby providing a relative adjustment between the piston 29 and crank arm 31 in a manner to compensate for any wear in the brakes or elements comprising the brake mechanism.

For normally actuating the brake mechanism, a service brake pedal 36, pivotally mounted on the clutch housing 16 in the usual manner, is connected by means of a link 37 to an equalizer bar 38 intermediate its end portions, one end of the equalizer bar being connected by means of a link 39 with an arm 40 secured to one end of the rock shaft 30, while the opposite end of the bar 38 is provided with a fork 41 adapted to engage a collar 42 adjustably mounted on a rod 43 by means of a set screw 44.

As is well known by persons familiar with the operation of heavy vehicles such as trucks, or the like, considerable braking power is often required to overcome the inertia of a heavily loaded vehicle, and for this reason, it has been found desirable to provide means for augmenting the manual power exerted on the brake mechanism for exerting greater pressure and closer contact between the brake elements associated with the traction or supporting wheels of the vehicle.

The present invention provides novel means for producing the additional force required, and, in the present embodiment, includes a brake drum 45 secured to a stub shaft 46 suitably connected to and forming a part of the propellor shaft 19. Positioned within the drum 45 is a brake band or shoe 47 adapted, in the present instance, to be expanded into engagement with the drum by means of a wedge 48 positioned between antifriction rollers 49 mounted in brackets 50 secured to each end of the shoe 47.

For expanding the shoe 47 as desired, the wedge 48 is pivotally mounted at 51 (Fig. 7) to one end of the rod 43 on which the collar 42 is mounted and against which the forked end of the bar 38 is adapted to engage.

Pivotally mounted on a stud 52, carried preferably by the transmission housing 18, are a plurality of oppositely disposed integral arms 53 and 54, the upper arm 53 having a link 55 pivotally connected thereto while the opposite end of the link is forked and provided with slots 56 adapted to receive a pin 57 mounted in the upper or free end of an arm 58 secured to one end of the rock shaft 30.

The lower arm 54 is pivotally connected to one end of a link 59, the opposite end of which is forked in a manner to straddle the arm 58 within the forks of the link 55 and provided with slots 60 adapted to receive the pin 57 mounted on the arm 58 in much the same manner as the pin is received by the slots 56 of the link 55. Thus, it will be seen that a connection is established between the brake operating mechanism of the housing 20 and the integral arms 53 and 54 in such a manner that any movement of the arms in either direction will be transmitted to the rock shaft 30 for actuating the piston 29.

Rigidly connected to the integral arms 53 and 54 and extending laterally therefrom is a finger 61 having a cylindrical block 62 rotatably mounted on the end thereof, the block 62 being loosely mounted and rotatably movable in a socket or cylindrical portion 63 formed on a casing 64 secured to a bracket 65, the bracket 65 being connected by means of rivets 66 to the brake shoe 47, thereby providing a universal connection with and a movable anchor for the brake shoe.

It will be observed from the foregoing description that when pressure is exerted on the foot pedal 36, the equalizing bar 38 will be moved forwardly and by reason of its connection at one end through the link 39 with the arm 40, the piston 29 will be moved to exert an initial fluid pressure on the braking devices associated with the respective wheels 13 and 14 of the vehicle, and the opposite end of the bar 38, by reason of its engagement with the collar 42, will move the wedge 48 forwardly in a manner to expand the shoe 47 within the drum 45. It will be observed that by reason of the limited movement permitted by the type of anchor above described, the engagement of the shoe 47 with the rotating drum 45 will cause the finger 61 and arms 53 and 54 to be rocked about the stud 52 in a manner to cause one or the other of the links 55 or 59, depending upon the direction of rotation of the drum 45, to rock the shaft 30 in the housing 21 in a manner to augment the pressure exerted on the foot pedal 36, the connection with the drum 45 serving to actuate the piston 29 in a manner to exert additional pressure on the fluid in the system for more effectively actuating the brake elements associated with the respective wheels of the vehicle.

It will be observed also that when the shaft 30 is rocked by one or the other of the links 55 or 59, the rod 39 is moved forwardly, allowing the equalizer bar 38 to pivot about its connection with the link 37, thereby relieving the pull on the rod 43, and relieving some of the force which has caused the stud 52 and arms 53 and 54 to rotate, in which event, it will be necessary to force the pedal 36 further down to maintain the wedge 48 in the previous or desired position of engagement. By such an arrangement, it will be obvious that the braking effect of the device is directly proportional to the depression of the foot pedal 36, thereby eliminating the possibility of unintentionally or accidentaly locking the supporting wheels 13 and 14 of the vehicle against rotation.

A hand or parking brake lever 67 is pivotally mounted at 68 to the frame of the vehicle, and it will be noted that the forward end of the rod 43 is slotted as indicated at 69 (Figs. 2 and 4), and adapted to receive a pin 70 mounted adjacent the lower end of the lever 67. As is well known in motor vehicle structure, the hand or emergency lever 67 is normally in its released or inoperative position as shown in Figs. 2 and 4 of the drawings, and by providing the slot 69, longitudinal movement of the rod 43 is permitted during the normal operation of the service brake pedal 36 without any interference by reason of the connection between the rod 43 and the hand lever 67.

One of the integral arms 53 or 54, preferably the arm 53, is provided on one of its vertical faces with a plurality of clutch teeth 71 adapted to be engaged by similarly formed teeth 72 mounted on one end of a longitudinally movable rod 73 slidably mounted in bearings 74 and 75 suitably mounted on the frame of the vehicle, the teeth 72 being urged normally toward the teeth 71 by a spring 76 surrounding the rod 73 and operating between the bearing 74 and a collar 77 secured to the rod. The opposite end of the rod 73 is notched or cut away on its upper and lower sides to form a head or shoulder 78 (Fig. 2) adapted to be engaged by one of the vertical sides of a cam fork 79 having a thickened portion 80 and a relatively thinner portion 81 connected together by a cam portion 82 formed on the opposite vertical side of the fork. The cam fork 79 is secured to one end of a rod 83, the opposite end of which is pivotally connected to the hand lever 67 by means of the pin 70, and, when in normal position, the thickened portion 80 of the fork cooperates with the adjacent face of the bearing 74 to normally hold the rod 73 in its retracted position with the teeth 72 out of engagement with the teeth 71 on the arm 53, but when it is desired to park the vehicle in the ordinary way, by applying the brake shoe 47 to the brake 45, the hand lever 67 may be manipulated in the usual manner, and the first or initial movement of the hand lever will draw the rod 83 longitudinally and the thickened portion 80 of the cam fork 79 from between the shoulder 78 and bearing 74 until the thinner portion 81 of the cam fork 79 is positioned between the bearing 74 and the shoulder 78 of the rod 73, thereby permitting the spring 76 to move the rod toward the arm 53 and the teeth 72 into engagement with the teeth 71 formed on the arm in a manner to retain the integral arms 53 and 54 in their normal or neutral position, thereby securing the finger 61 against movement and providing a stationary anchor for the brake shoe 47. Thereafter, the continued operation of the hand lever 67 will serve to draw the rod 43 and wedge 48 forwardly in a manner to expand the brake shoe 47 into braking engagement with the brake drum 45.

For releasing the shoe 47, a movement of the hand lever 67 in the opposite direction produces a reverse movement of the cam rod 83, cam fork 79 and rod 43 in such a manner that the wedge 48 will be moved rearwardly to permit the brake shoe 47 to contract and assume its normal position, and at substantially the same time or immediately thereafter, the cam portion 82 of the fork 79 will engage a cam face 84 formed on the bearing 74 in a manner to move the rod 73 longitudinally against the action of the spring 76, and the teeth 72 out of engagement with the teeth 71 formed on the lever 53 Thus, it will be observed that if desired, the vehicle may be slowed down and brought to a stop by manipulating the hand lever 67 in a manner to expand the brake shoe 47 into engagement with the drum 45, and that such operation of the hand lever will in no way effect an operation of the brake mechanism associated with the supporting wheels 13 and 14 of the vehicle.

It will be observed also that to secure the vehicle against rolling or undesired movement at a time when the engine is not running, the hand lever 67 may be actuated in the manner above described to expand the brake shoe 47 into engagement with the drum 45 with sufficient force to hold the vehicle against movement in the manner common to ordinary hand-operated parking brakes. In such case, as above noted, the rod 73 will be released and the teeth 72 permitted to engage the teeth 71, thereby anchoring the brake shoe 47 against movement, and upon manipulating the hand lever 67 in a manner to release the brake shoe 47 to permit the vehicle to be operated, the rod 73 and teeth 72 will be withdrawn against the action of the spring 76 to their normal or inoperative position.

A quadrant 85 or other suitable retaining means may be positioned on the vehicle frame in a manner to cooperate with a detent 86 mounted on the hand lever 67 for securing the lever in adjusted position.

If, for any reason, it should be found desirable to park the vehicle with the service brakes associated with the respective supporting wheels in operative engagement, this may be accomplished by actuating the foot pedal 36 while the drum 45 is rotating, thereby actuating the piston 29 and brake band 47 in the manner above described to augment the pressure exerted on the foot pedal, thereafter by manipulating the hand lever 67 and releasing the rod 73 in a manner to cause the teeth 72 carried thereby to engage the teeth 71 formed on the integral arms 53, the piston 29 may be retained in its brake operating position.

For releasing the brake operating means from the position just described to permit the vehicle to be operated, it is only necessary to release or move the hand lever 67 in the opposite direction, thereby withdrawing the teeth 72 from engagement with the teeth 71 and permitting the respective brake and brake actuating elements to assume their normal positions.

It will be observed from the foregoing description that the present invention provides novel manually controlled power operated means for augmenting the operation of manually operated brake mechanism and also provides a structure wherein manually controlled means may be employed for retaining the brake mechanism and power actuated means in brake operating position, and at the same time permits the vehicle to be controlled by the hand operated or parking devices in the usual manner.

Obviously, the present invention is not limited to the precise construction and arrangement shown and described, as the same may be variously modified. Moreover, all the features of the present invention need not be used conjointly, as the same may be used to advantage in variously different combinations and sub-combinations.

Having thus described our invention, we claim:

1. In a braking device for motor vehicles, the combination with manually operated brake mechanism therefor, including a lever for actuating said mechanism of a brake drum, drum engaging means operatively related thereto, hand operated means for actuating said drum engaging means, an equalizing bar operatively related to said hand operated means and said brake mechanism, and means operatively related to said mechanism and actuated by said drum engaging means for augmenting the operation of said brake mechanism.

2. In a braking device for motor vehicles, the combination with manually operated brake mechanism therefor, including a lever for actuating said mechanism of a brake drum, a brake shoe operatively related thereto, hand operated means for actuating said brake shoe, an equalizing bar operatively related to said hand operated means and said brake mechanism, and means operatively related to said mechanism and actuated by said brake shoe for augmenting the operation of said brake mechanism.

3. In a braking device for motor vehicles having a propeller shaft, the combination with manually operated wheel brake mechanism therefor, of a brake drum mounted on the propeller shaft of the vehicle, a brake shoe operatively related to said drum, hand operated means for actuating said shoe, a bar operatively related to said hand operated means and said brake mechanism, brake shoe actuated means for augmenting the operation of said wheel brake mechanism, and means operatively related to and controlled by said hand operated means for securing the brake shoe operated means in wheel brake operating position.

4. In a braking device for motor vehicles having a propeller shaft, the combination with manually operated fluid actuated wheel brake mechanism therefor including a master cylinder, of a brake drum mounted on the propeller shaft of the vehicle, a brake shoe operatively related to said drum, hand operated means for actuating said shoe, a bar operatively related to said hand operated means and said brake mechanism, brake shoe actuated means operatively related to said master cylinder for augmenting the operation of said wheel brake mechanism, and means operatively related to and controlled by said hand operated means for securing said brake shoe operated means in wheel brake operating position.

5. In a braking device for motor vehicles having a propeller shaft, the combination with fluid actuated wheel brake mechanism therefor, of a brake drum mounted on the propeller shaft of the vehicle, a brake shoe operatively related to said drum, hand operated means operatively related to said shoe, a bar operatively related to said hand operated means and said brake mechanism, manually operated means connected to said bar, a pivotally mounted arm connected to said brake mechanism and operatively related to said shoe for augmenting the operation of the brake mechanism, and clutch means operatively related to and controlled by said hand operated means for securing said arm in wheel brake operating position.

6. In a braking device for motor vehicles having a propeller shaft, the combination with fluid actuated wheel brake mechanism therefor, of a brake drum mounted on the propeller shaft of the vehicle, a brake shoe operatively related to said drum, hand operated means operatively related to said shoe, a bar operatively related to said hand operated means and said brake mechanism, manually operated means connected to said bar, an arm pivotally mounted intermediate its ends and having its end portions connected to said brake mechanism and operatively related adjacent its central portion to said shoe for augmenting the operation of the brake mechanism when said shoe is actuated, and clutch means operatively related to and controlled by said hand operated means for securing said arm in wheel brake operating position when said hand operated means is actuated.

7. In a braking device for motor vehicles having a propeller shaft, the combination with fluid actuated wheel brake mechanism therefor, of a brake drum mounted on the propeller shaft of the vehicle, a brake shoe operatively related to said drum, hand operated means operatively related to said shoe, a bar adjustably related to said hand operated means and to said brake mechanism, manually operated means connected to said bar, a plurality of pivotally mounted arms having their free end portions connected by means of slotted links to said brake mechanism and operatively related to said brake shoe in a manner to be moved thereby for augmenting the operation of the brake mechanism, and clutch means operatively related to and controlled by said hand operated means for securing said arm in wheel brake operating position when said hand operated means is actuated.

8. In a braking device for motor vehicles having a propeller shaft, the combination with fluid actuated wheel brake mechanism therefor, of a brake drum mounted on the propeller shaft of the vehicle, a brake shoe operatively related to said drum, hand operated means operatively related to said shoe, a bar adjustably related to said hand operated means and to said brake mechanism, manually operated means connected to said bar, a plurality of oppositely disposed pivotally mounted arms having their free end portions connected by means of slotted links to said brake mechanism and having laterally extending means pivotally connected to said brake shoe in a manner to be moved thereby for augmenting the operation of the brake mechanism, and spring actuated clutch means operatively related to and controlled by said hand operated means for securing said arm in wheel brake operating position when said hand operated means is actuated.

9. In a braking device for motor vehicles, the combination of fluid actuated wheel brake mechanism therefor including a master cylinder housing having a pressure chamber formed therein and a piston slidably mounted in said chamber, a rock shaft mounted in said housing and having a crank arm operatively related to said piston, a brake drum mounted on the propeller shaft of the vehicle, a brake shoe operatively related to said drum, a hand lever, a slotted rod connected to said lever for actuating said shoe and having a collar adjustably mounted thereon, a link operatively related at one of its ends to said rock shaft, a bar pivotally connected at one of its ends to one end of said link and provided at its opposite end with a fork adapted to engage said collar, a foot pedal operatively connected to said bar intermediate its ends, oppositely disposed integral arms pivotally mounted on the vehicle, links having slots formed therein pivotally connected to the free ends of said arms and operatively related at their slotted ends to said rock shaft, a finger rigidly connected to said arms and having a universal connection with said shoe, teeth formed on one side of one of said integral arms, a spring actuated retaining member adapted to cooperate with said teeth, a rod pivotally connected at one of its ends to said hand lever and having a cam at its opposite end adapted to cooperate with a cam face carried by the vehicle for controlling the operation of said retaining member, and means mounted in said cylinder housing for adjusting said piston relatively to said crank arm.

10. In a braking device for motor vehicles having a propeller shaft, the combination with wheel brake mechanism therefor, of a brake drum mounted on the propeller shaft of the vehicle, a brake shoe operatively related to said drum, means for expanding said shoe into engagement with the drum, pivotally mounted means operatively related to said brake mechanism and to said shoe for actuating the brake mechanism when said shoe is moved into engagement with said drum, and retaining means cooperable with said pivotally mounted means for retaining said mechanism in wheel brake operating position.

11. In a braking device for motor vehicles having a propeller shaft, the combination with wheel brake mechanism therefor, of a brake drum mounted on the propeller shaft of the vehicle, a brake shoe operatively related to said drum, manually operated means for expanding said shoe into engagement with the drum, pivotally mounted means operatively related to said brake mechanism and to said shoe for actuating the brake mechanism when said shoe is moved into engagement with said drum, and hand controlled retaining means cooperable with said pivotally mounted means for retaining said mechanism in wheel brake operating position.

12. In a braking device for motor vehicles having a propeller shaft, the combination with the propeller shaft of the vehicle, of a brake drum mounted thereon, an annularly movable brake shoe operatively related to said drum, a hand lever mounted on the vehicle, means operatively related to said shoe and controlled by said hand lever for securing the shoe against annular movement, and means operated by said hand lever for actuating said brake shoe into engagement with said drum for retarding the rotation of the propeller shaft.

13. In a braking device for motor vehicles having a propeller shaft, the combination with fluid actuated wheel brake mechanism therefor, of a brake drum mounted on said propeller shaft, a brake shoe operatively related to said drum, hand operated means operatively related to said shoe, a bar operatively related to said hand operated means and said brake mechanism, manually operated means connected to said bar, a pivotally mounted arm connected to said brake mechanism and operatively related to said shoe for augmenting the operation of the brake mechanism, and means operatively related to said arm for securing the arm in wheel brake operating position.

14. In a braking device for motor vehicles having a propeller shaft, the combination with said propeller shaft, of a brake drum mounted thereon, an annularly movable brake shoe operatively related to said drum, a hand lever mounted on the vehicle, means operatively related to said shoe for securing the shoe against annular movement, and means operated by said hand lever for actuating said brake shoe into engagement with said drum for retarding the rotation of said propeller shaft.

15. In a braking device for motor vehicles having a propeller shaft, the combination with wheel brake mechanism therefor, of a brake drum mounted on said propeller shaft, an annularly movable brake shoe operatively related to said drum, means for actuating said shoe, manually operated means operatively related to said shoe actuating means and said brake mechanism, a pivotally mounted arm connected to said brake mechanism and operatively related to said shoe in a manner to be moved thereby for augmenting the operation of the brake mechanism, means for securing said arm against movement in either its normal or changed position, and a second manually operated means for controlling the position of said securing means and operatively related to said shoe actuating means for moving the shoe into engagement with said drum to retard the rotation of the propeller shaft when said securing means is in position to hold said arm in its normal position.

16. In a braking device for motor vehicles, the combination with brake mechanism therefor, of a power driven brake drum, drum engaging means operatively related thereto, a bar operatively related to said brake mechanism and said drum engaging means, a foot pedal operatively connected to said bar for manually actuating said drum engaging means and said brake mechanism, and means operatively related to said mechanism and actuated by said drum engaging means for augmenting the operation of said foot pedal on said brake mechanism, said last mentioned means being operatively related to said bar and foot pedal in a manner to relieve the force exerted to actuate said drum engaging means and provide an augmenting force exerted on said brake mechanism directly proportional to the force exerted on said foot pedal.

JOHN W. TATTER.
FREDERICK W. SAMPSON.